United States Patent [19]

Kitai et al.

[11] 4,349,258
[45] Sep. 14, 1982

[54] MANUAL FOCAL POINT ADJUSTING AND CHANGE-OVER DEVICE FOR USE IN AUTOMATIC FOCAL POINT ADJUSTER CAMERA

[75] Inventors: Kiyoshi Kitai; Masaru Kobayashi; Tadashi Nakagawa; Hiroaki Ishida; Masanori Watanabe; Yuzuru Takazawa, all of Shikawatashi, Japan

[73] Assignee: Seiko Koki Kabushiki Kaisha, Japan

[21] Appl. No.: 177,186

[22] Filed: Aug. 11, 1980

Related U.S. Application Data

[63] Continuation of Ser. No. 961,871, Nov. 17, 1980, abandoned.

[30] Foreign Application Priority Data

Nov. 18, 1977 [JP] Japan .................... 52-138730
Nov. 18, 1977 [JP] Japan .................... 52-138731
Nov. 18, 1977 [JP] Japan .................... 52-154879

[51] Int. Cl.$^3$ ............... G03B 3/00; G03B 15/03; G03B 17/18
[52] U.S. Cl. .................... 354/127; 354/149; 354/196; 354/198; 354/289
[58] Field of Search .......... 354/25, 27, 32, 40, 354/48, 60 R, 60 F, 139, 149, 195, 196, 198, 289, 127, 128, 43, 44, 47, 38, 36, 29, 30, 25 A, 25 P, 25 N, 31 F; 352/49, 140, 141

[56] References Cited

U.S. PATENT DOCUMENTS

| | | | |
|---|---|---|---|
| 3,886,568 | 5/1975 | Yazaki et al. | 354/27 |
| 4,100,554 | 7/1978 | Iijima | 354/149 X |
| 4,124,855 | 11/1978 | Uchidoi et al. | 354/38 X |
| 4,148,574 | 4/1979 | Johnson | 354/195 |
| 4,153,903 | 5/1979 | Pizzuti et al. | 354/195 |

Primary Examiner—L. T. Hix
Assistant Examiner—William B. Perkey
Attorney, Agent, or Firm—Robert E. Burns; Emmanuel J. Lobato; Bruce L. Adams

[57] ABSTRACT

A focal point adjusting and change-over mechanism for an automatic focusing camera, including a mechanism for restricting a position of the camera photographic lens in response to a distance sensing signal, and a change-over mechanism manually operable to at least two positions including an automatic position and a manual position. The restricting mechanism is operative to provide automatic focusing of the lens when the change-over mechanism is set at a position for automatic operation, and the change-over mechanism renders the distance sensing signal or the restricting mechanism inoperative when set at the position for manual operation, and thereby manual focusing is carried out in accordance with the manually set position of the change-over mechanism in the manual position.

14 Claims, 9 Drawing Figures

MANUAL FOCAL POINT ADJUSTING AND CHANGE-OVER DEVICE FOR USE IN AUTOMATIC FOCAL POINT ADJUSTER CAMERA

This is a continuation, of application Ser. No. 961,871, filed Nov. 17, 1980 and now abandoned.

BACKGROUND OF THE INVENTION

The present invention relates to a type of a camera wherein its adjustment of a focal point of a photographing lens is performed automatically.

In general, when a photograph is to be taken by a camera, the camera is directed toward an object after each of the exposure factors is set and the focal point of the photographing lens is set, and then the exposing operation may be carried out by releasing the camera shutter.

There have been proposed various kinds of automatic setting techniques for the abovementioned exposure factors which they have been aimed at on the basis of much experimental data or past experience.

However, in the case of an operation for adjusting a focal point of said photographing lens relative to an object having low contrast, a dark surrounding area and an arrangement of the object on the image, a conventional operational process for carrying out an automatic focusing has not provided any critical method. Thus in order to provide a coincident focusing operation which the photographer may agree with, it may be required to apply a prior art manual operation.

However, if it is possible to provide an ordinal image of photographing, a camera which enables an automatic focal point adjusting will be extremely convenient to the user.

SUMMARY OF THE INVENTION

The present invention has as an object to provide a camera in which an automatic focal point adjustment is provided along with a manual focal point adjustment. Another object is to enable a selection of one of the focal point adjustment modes by a simple change-over operation so as not to allow any wrong operations of the operator.

In order to prevent the operator from performing an erroneous operation of a camera, a selection of automatic or manual focal point modes of adjustment may be performed by a simple change-over operation and the selected adjustment process may be displayed in such a manner as it can be easily ascertained. Further an object of the present invention is to provide a camera equipped with an automatic focusing means and a manual focusing means together, wherein the photographer is allowed to optionally select either of the systems, automatic and manual, by a simple operation of a mode changing device.

The present invention will enable manual focal point adjustment by providing a camera such as an automatic focal point adjusting camera in which a distance between an object and the camera is detected to enable automatic focusing of the photographing lens, and in which there are provided means for restricting a position of the photographing lens in response to a distance signal, and a change-over means operable to at least two positions including an automatic mode position and a manual mode position. The restricting means is operated to provide automatic focusing for the photographing lens at an automatic operation mode setting of said change-over means, and makes said signal or said restricting means inoperative at a position for manual operation mode and thereby manual focusing may be carried out.

Further, it is possible to render the camera operative for flash-light photographing in cooperation with the change-over of said change-over means into said manual mode position.

Said restricting means includes an electro-magnet controlled by said signal and enables said electro-magnet to be inoperative in cooperation with change-over of said change-over means to said manual mode position.

Said automatic mode position for said change-over means includes two positions. In a first position for automatic operation an automatic exposure control device is operated under natural light, and in the second automatic mode position an automatic exposure control device is operated under artificial light.

Said flash-light photographing device includes an illuminating unit and enables said illuminating unit to be illuminated in cooperation with said mode change-over means.

Said flash-light photographing device includes at least either an aperture device or an exposure time control device and enables an adjustment of at least one of them to a value appropriate to an artificial light.

This invention may provide a mode change-over device in an automatic focal point adjusting camera in which a distance between the object and, the camera is sensed to enable an automatic focusing of a photographing lens in which there are provided mode change-over means operable to at least two positions including an automatic and a manual focal point mode positions, a flash-light change-over device movable from its non-operative position to its operative position in response to a change-over of said mode change-over means said manual focal point adjusting mode position, and limiting means for restricting said flash-light change-over device at its non-operative position. The mode change-over means having an operating region for releasing said limiting means in cooperation with a mode change-over operation from the automatic adjusting mode position to the manual adjusting mode position. The flash-light change-over device is restricted to an inoperative position by said limiting means at said manual adjustment position when said flash-light change-over device is moved to its inoperative position and moves said flash-light change-over device to its inoperative position in cooperation with the change-over of said mode change-over means into said automatic focal point adjusting mode position.

At an inoperative position of said flash-light change-over device an automatic exposure control device may be under natural light, and at an operative position of said flash-light change-over device an automatic exposure control device may be operated under artificial light.

There may be provided a display means for displaying at least said two positions of said mode change-over means, and to display a corresponding position in cooperation with change-over of said mode change-over means.

Said flash-light change-over device may be arranged such that it may be moved in sequence to a first position in which it is moved along with said change-over means, a second position in which it is restricted by said limiting means, and said operative position.

According to the present invention, a flash exposure setting changing device for the automatic focusing camera comprises an automatic focusing device which detects the distance between the photographed object and the camera and automatically focuses the photographing lens; a changing means which manually selects the automatic range and the manual range of said focusing device; an exposure control member which controls the shutter aperture corresponding to the output level of an electronic module; and a setting means which changes said electronic module between the natural light automatic exposure control mode and the flash light automatic exposure control mode, wherein said changing means has a first changing unit which makes said focusing device manually operable only in the manual range, and a second changing unit which changes said setting means to the natural light automatic exposure control mode in the automatic range of said focusing device and changes said setting means to the flash light automatic exposure control mode in the manual range of said focusing device.

Furthermore, said changing means has a range factor selection unit which changes said setting means to said flash light exposure control in the manual range and sets the range value of said electronic module corresponding to the selected range.

Still further, said range factor selection unit is provided with a plurality of electric elements of different values and is adapted to connect said electric elements to said electronic module depending on the selected range in the manual range of said changing means.

Accordingly, the mode changing device is set to the natural light automatic exposure control mode when the camera is used in the condition where the automatic focusing is possible while the mode changing device is set to the flash light automatic exposure control mode simultaneously with the changeover from the automatic focusing to the manual focusing. Then, the exposure operation is performed corresposnding to the selected range.

BRIEF DESCRIPTION OF THE DRAWINGS

The accompanying drawings show perspective views of the preferred embodiment of the present invention.

DESCRIPTION OF THE PREFERRED EMBODIMENTS

Figure 1:
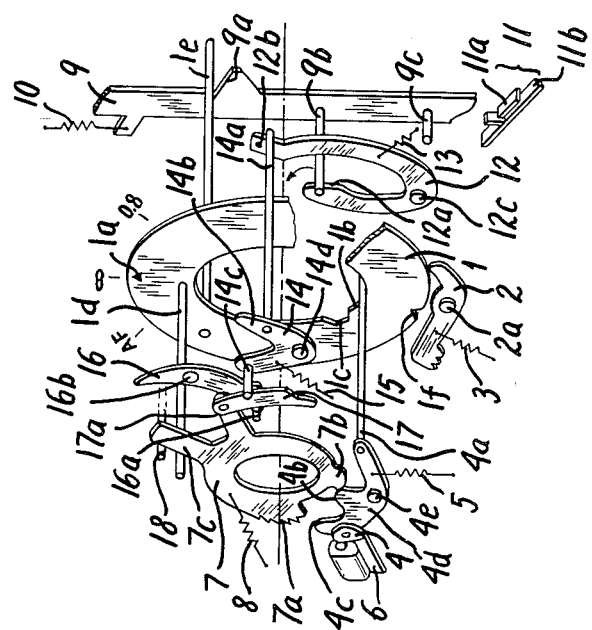
FIG. 1 is a partial view of the first embodiment.

Referring now to the drawings, a preferred embodiment of the present invention will be described in more detail.

In the drawings, a change-over ring 1 has an index 1a, steps 1b and 1c, pins 1d and 1e and a recess 1f. The change-over ring 1 is installed on a base plate (not shown) of a lens barrel in such a manner that the ring is rotatable around the lens optical axis. The pawl 2 of the change-over ring is rotatably supported at a shaft 2a on the base plate of lens barrel (not shown) and biased in a counter clockwise direction by the spring 3. The iron piece lever 4 has a pin 4a, a cam 4b, a pawl 4c and an iron piece 4d. The iron piece lever is rotatably supported at a shaft 4e on the base plate (not shown) of the shutter and biased in a clockwise direction by a spring 5. An electro-magnet 6 is connected with a focal point sensing circuit (not shown) to control a movement of the iron piece lever 4. Focal point adjustor ring 7 has an engaging tooth 7a, a cam 7b and an arm 7c. The ring is installed on a base plate of the shutter (not shown) in such a manner as it is rotated around the optical axis and biased in a counter clockwise direction by a spring 8. An electronic flash control plate 9 has a cam 9a, pins 9b and 9c and is installed on a camera body (not shown) in such a manner as it is movable in upward and downward directions. The electronic flash control plate is normally biased upward by a spring 10. Self-closed power switch 11 is comprised of a contact receiver 11a and a contact 11b. A change-over lever 12 has cams 12a and 12b and is rotatably supported at a shaft 12c on the camera body (not shown) and biased in a clockwise direction by a spring 13. An aperture cam lever 14 has a pin 14a, a cam 14b and a pin 14c and is rotatably supported at a shaft 14d on a base plate (not shown) of the shutter and further biased in a counter clockwise direction by a spring 15. ASA lever 16 is provided with a pin 16a and supported at a shaft 16b on the base plate of the shutter (not shown) in such a manner as it is operable. A range cam 17 is rotatably supported at the shaft 17a on a focal point adjustor ring 7. Pin 18 will restrict the focal point adjustor ring 7 at the charging position.

At first, a condition of manual focal point adjustment shown in FIG. 1 will be described. The index 1a of the change-over ring 1 is faces a fixed display scale and shows the operator that the camera is in a condition of manual focal point adjustment. The step 1b of the change-over ring 1 will restrict the operational range of the pin 4a fixed on the iron piece lever 4 and keep the iron piece lever 4 in such a counter clockwise rotated position (i.e. inoperative position of the iron piece lever 4) in which the pawl 4c is apart from the tooth 7a of the focal point adjustor ring 7 and the iron piece 4d is abutting the electro-magnet 6. Further, the pin 1d of the change-over ring 1 will restrict the operational range of the arm 7c of the focal point adjustment ring 7.

Under the condition of manual focal point adjustment as described above, the pin 18 cooperating with a push-down movement of the release button of the camera is moved away from the operational range of the arm 7c of the focal point adjustment ring 7, said focal point adjustor ring 7 starts to rotate in a counter-clockwise direction by the spring 8, and then abuts against the pin 1d of said change-over ring 1 and stops. The photographing lens (not shown) will be moved in response to a movement of said focal point adjustor ring 7. During this movement, since a position of the change-over ring 1, as described above, is related to a position of the photographing lens via the pin 1d and the focal point adjustor ring 7, the adjustment of a position of the change-over ring 1 in reference to the index 1a will enable the photographing lens to be adjusted to such a position as it will correspond to a desired camera-to-subject distance and manual focal point adjustment is carried out in this manner.

On the other hand, since the pin 1e of the change-over ring 1 is in a position clear of the operational range of the cam 9a of the flash-light control plate 9, and thus the flash-light control plate 9 is kept in an upper position by a force of spring 10. The pin 9b of said flash-light control plate will push the cam 12a of the change-over lever 12 and keep said change-over lever 12 in such a counter-clockwise position acting against the spring 13 as the cam 12b is moved away from the operational range of the pin 14a of the aperture cam lever 14. Since the pin 9c of said flash-light control plate 9 is clear of the flash-light power switch 11, said flash-light power switch 11 will assume a state wherein the contact piece 11b and the contact piece receiver 11a are in contact with each other under the spring force of its contact pieces and thus enable the flash-light device to be illuminated. The aperture cam lever 14 is moved in a counter-clockwise direction by the spring 15 and moves to a position such that the cam 14b may cooperates with the aperture device of the shutter (not shown). The counter-clockwise rotational position of said aperture cam lever 14 will be determined by a cooperative action between the pin 16a placed at such position as to correspond to a film speed selected by ASA lever 16 and the range cam 17 for use in providing information of camera-to-subject distance corresponding to the position that the focal point adjustor ring 7 is manually adjusted as described previously. The diameter of the aperture in the shutter is controlled with reference to a position of the cam 14b of said aperture cam lever 14 and thus it is possible to provide such an aperture diameter as is adaptable to the ASA speed and the camera-to-subject distance.

Under such condition as described above, automatic exposure control may be performed in a manner such that the camera is suitable for performing flash-photography.

The operation to be performed under such condition as an automatic focal point adjustment will now be described.

At first, when the change-over ring 1 is rotated in a counter-clockwise direction until the index 1a is aligned with AF scale, the pawl 2 is engaged with the notch 1f of the change-over ring 1 under action of the spring 3 to hold said change-over ring 1 at the engaged position. Counter-clockwise rotation of said change-over ring 1 will cause the step 1b to be moved away from the operational range of the pin 4a of the iron piece lever 4 and in turn causes the step 1c to be brought within said operational area. Since said step 1c has a size larger than that of the operational range of the pin 4a of said iron piece lever 4, the iron piece lever 4 will enable an automatic focal point adjustment operation to be described below. The pin 1d of the change-over ring 1 is also rotated in a counter-clockwise direction away from the operational area of the arm 7c of the focal point adjustor ring 7 and therefore the manual focal point adjustment caused by said change-over ring 1 is not performed. The cam 7b will push the cam 4b of the iron piece lever 4 and keep the iron piece 4d pressed to the electro-magnet 6 in opposition the spring 5.

Under such automatic focal point adjustment and the pressed condition of the iron piece lever 4 as described above, a power supply is connected to the well-known focal point sensor, not shown, (including a sensor circuit) which cooperates with the push-down movement of the release button of the camera and the electro-magnet 6 is energized to retract the iron piece 4d of the iron piece lever 4 and thereby the iron piece lever 4 is kept at the charged position shown in the drawings. Subsequent to the push-down operation of the release button, the pin 18 will move away from the operational area of the arm 7c of the focal point adjustor ring 7 and counter-clockwise rotation of the focal point adjustor ring 7 is started by the spring 8. Said focal point sensor device which cooperates with the counter-clockwise rotation of said focal point adjustor ring 7 also starts its focal point sensing operation. When said focal point sensor device senses the coincident focal point, said electro-magnet 6 is deenergized and the retracted iron piece lever 4 is released. The released iron piece lever 4 is rotated in a clockwise direction by the spring 5 and causes the tooth 7a of said focal point adjustor ring 7 to be engaged with the pawl 4c and thereby to hold said focal point adjustor ring 7 at the position of coincident focal point. Similar to the case when the manual focal point adjustment is to be performed as described above, the photographing lens is also moved to a position of focus.

To the contrary, counter-clockwise rotation of said change-over ring 1 will cause the pin 1e to press the cam 9a of the flash-light control plate 9 and said flash-light control plate 9 is pushed downward and then held thereat. Since a pushing down of said flash-light control plate 9 will cause the pin 9b to be disengaged from the cam 12a of the change-over lever 12, the change-over lever 12 is rotated in a clockwise direction by the spring 13. The pin 9c presses the contact piece 11b of the flash-light power switch 11 and the contact piece is moved away from the contact piece receiver 11a, thereby the flash-light power switch 11 is turned off and thus the flash-light device is made to be inoperative. Clockwise rotation of said change-over lever 12 will cause the cam 12b of said change-over lever 12 to press against the pin 14a of the aperture cam lever 14 and then to hold said aperture lever 14 in a position of clockwise rotation against a force of the spring 15. In the position of clockwise rotation of said aperture cam lever 14, the cam 14b is moved away from the operational area of a well-known aperture device of the shutter (not shown), thus said aperture cam lever 14 is kept at inoperative position.

The above described operation will cause a camera to change from its flash-light photographing mode.

Figure 2:
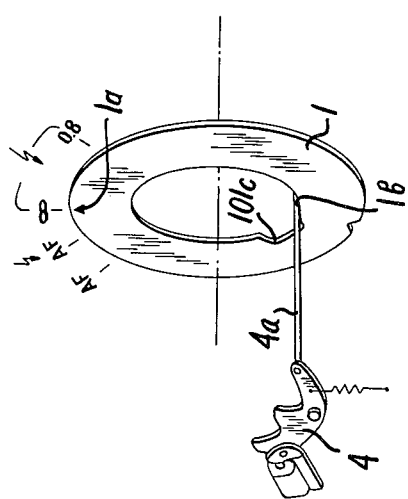
FIG. 2 is a partial view of another embodiment.

FIG. 2 shows another embodiment of the present invention in which automatic focusing adjustment and flash-light photographing may be carried out in addition to the operation of the change-over ring shown in FIG. 1. Since the flash-light photographing made by manual focusing adjustment and the natural light photographing made by automatic focusing adjustment are the same as that of the first embodiment discussed above, a description of their operations is omitted. Describing a newly added third embodiment, when the change-over ring 1 is rotated in a counter-clockwise direction until the index 1a is aligned with AF scale, a step 1b of said change-over ring 1 is moved away from the operational area of the pin 4a of the iron piece lever 4 and in place of the step 1b, a step 101c allowing the iron piece lever 4 to be operated is moved into the operational area of the pin 4a and the pin 1d is also moved away from the operational area of the arm 7c of a focusing point adjustor ring 7. Therefore as described above, it becomes possible to provide automatic focusing point adjustment. Further, since the pin 1e of the change-over ring is moved away from the operational area of said flash-light control plate 1, it becomes possible to provide flash-light photographing by the same operation as that of the flash-light photographing operation described above.

In cooperation with raising of the flash-light light control plate 9 of said embodiment, it is also possible to project the flash-light illuminating unit out of an interior of the camera body. Installation of the illuminating in said flash-light control plate 9 will enable a projection of the illuminating unit.

In the above mentioned embodiment, the flash-light control plate 9 is utilized for operating the flash-light power switch 11 and changing the operative and non-operative condition of the aperture cam lever 14 via change-over lever 12. It is also possible to provide a direct operation of the flash-light power switch by rotation of the change-over ring 1.

Further, it is also possible to arrange the distance cam 17 for use in feeding photographing range information on the focusing point adjustor ring 7 as well as on the change-over ring 1.

In order to facilitate a setting of range made by visual measurement, a manual focusing range scale opposite to the index 1a of the change-over ring 1 may be provided by a zone focus using well-known symbols in place of a numerical scale.

It is easy to arrange the power switch of the focusing point detector device such that the switch may be turned off by moving said change-over ring 1 in a manual focusing point adjustment range, and further it is possible to eliminate a wasteful consumption of electricity.

Modifications may either be made in which operations of the change-over ring 1 and the focusing point adjustor ring 7 are transformed into linear movement or the operation of the flash-light control plate 9 is changed to a rotational movement.

In the manual focusing point adjustment of the above described embodiment, it has been described that the settings may be made for a plurality of positions. However, it is well known in the art to provide lenses that are in focus for most all distances, and the present invention may be arranged such that a change-over operation between the automatic and manual focal point adjustments may be provided in a device for selecting only two specific positions.

For the electro-magnet 6 in the automatic focal point adjustor device, it is also possible to provide means for energization of the electro-magnet 6 only when the coincident focal points, ie the focused condition, are detected. In the modified form for the electro-magnet, the ring 7 may be engaged at a retracted position thereof or member engaged with the ring 7 may be released by an attraction of the electro-magnet. In case of this type of attracting electro-magnet, energization for the electro-magnet may be cut off in cooperation with change-over to the manual focal point adjustment mode of operation.

Figure 3:
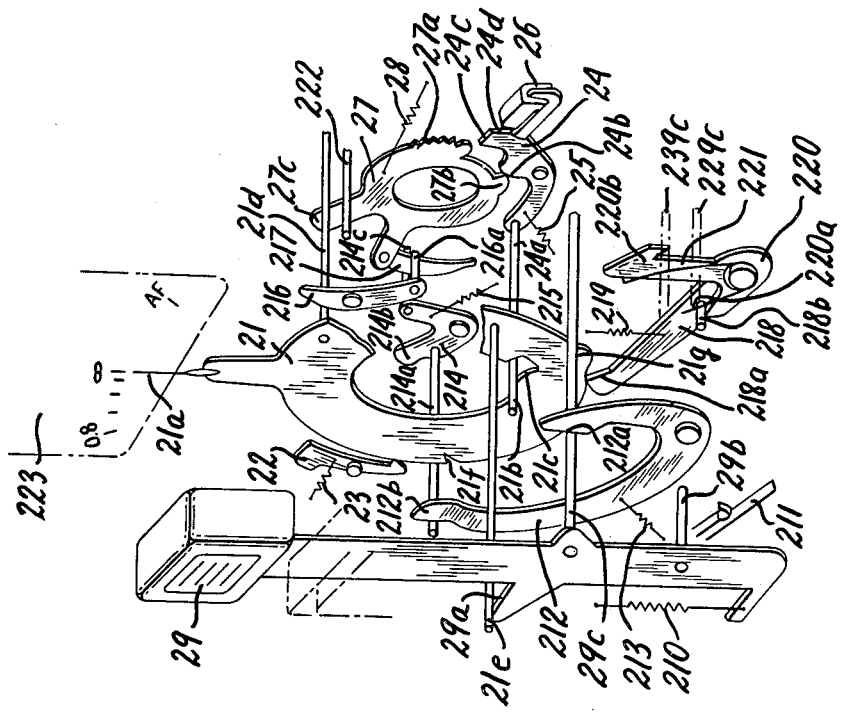
FIG. 3 is a perspective view of an embodiment of the present invention.

FIG. 3 shows an embodiment of a change-over device in which an automatic focal point adjusting position and a manual focal point adjusting position are changed.

Figure 4:
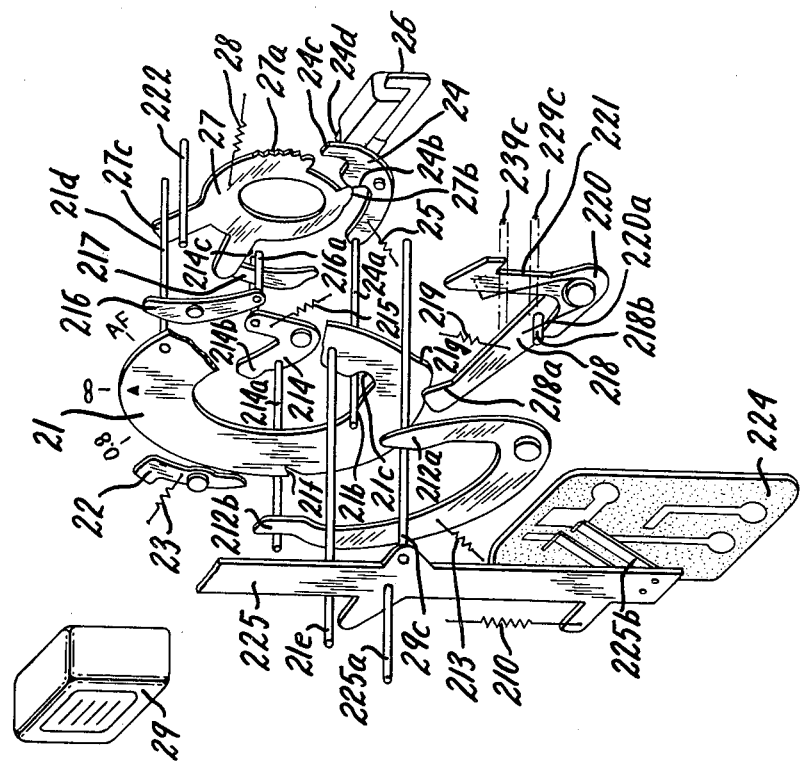
FIG. 4 indicates a perspective view showing another embodiment of the present invention.

FIG. 4 shows another embodiment of a flash-light device at a manual focal point adjusting position.

In FIG. 3, reference numeral 21 indicates a change-over ring having a pointer needle 21a, a step 21b and a step 21c, pins 21d and 21e, a groove 21f and a projecting part 21g. The change-over ring is rotatably arranged in a lens barrel not shown, and reference numeral 22 shows a lock claw which is biased in a counter-clockwise direction by a spring 23. Reference numeral 24 indicates an iron piece lever having a pin 24a, cam 24b, claw 24c, and an attracted part 24d. The iron piece is rotatably and pivotally arranged on a base plate of a lens barrel, not shown, and biased in a counter-clockwise direction by a spring 25. Reference numeral 26 indicates an electro-magnet connected to an electric circuit of a focal point sensing device, not shown, for use in controlling the iron piece lever 24.

Reference numeral 27 indicates an automatic focal point adjustor ring for restricting a position of the photographing lens. The automatic focal point adjustor ring has engagement teeth 27a, cam 27b and an arm 27c and is biased in a clockwise direction by a spring 28. Reference numeral 29 indicates a flash-light device having a projection 29a and pins 29b and 29c. The flash-light device is arranged in the camera body (not shown) in such a manner as it may be moved up and down and biased upwardly by a spring 210. Reference numeral 211 indicates a power switch for the flash-light device which is turned on as the flash-light is moved upward. Reference numeral 212 shows a change-over lever having cams 212a and 212b. The change-over lever is pivotally arranged on a camera body (not shown) and biased in a counter-clockwise direction by a spring 213.

Reference numeral 214 indicates an aperture cam lever having a pin 214a, a cam 214b and a pin 214c. The aperture cam lever is rotatably and pivotally arranged on a shutter base plate (not shown) and biased in a clockwise direction by a spring 215. Reference numeral 216 indicates ASA lever having a pin 216a. The ASA lever is rotatably and pivotally arranged on a shutter base plate (not shown). Reference numeral 217 indicates a range cam which is rotatably and pivotally arranged on the automatic focal point adjustor ring 27. Reference numeral 218 indicates an operating lever having a projection 218a and a pin 218b. The operating lever is rotatably and pivotally arranged on a base plate of a lens barrel (not shown) and biased in a clockwise direction by a spring 219.

Reference numeral 220 is a limiting lever having an end part 220a and a claw 220b. The limiting lever is coaxially supported with the operating lever 218 and biased in a clockwise direction by a spring 221. Reference numeral 222 indicates a set pin connected to a setting member on a shutter base plate (not shown) and arranged in such a manner as it may be moved in leftward and rightward directions.

Reference numeral 223 is a display plate for indicating an automatic focal point adjusting position and a manual focal point adjusting position. Reference numerals 229c and 239c show the operational position of the pin 29c of the flash-light device 29.

In FIG. 4, reference numeral 224 indicates a switch base plate of a power switch for the flash-light device. Reference numeral 225 shows a switch lever which may be operated from outside the camera. The switch lever is provided with a pin 225a and contact pieces 225b. Other component elements are the same as that of FIG. 3, and their description is omitted.

Operation of the structure shown in FIG. 3, wherein the change-over ring 21 is set at a manual focal point adjusting position will be described.

When the change-over ring 21 is changed from the automatic focal point adjusting position to the manual focal point adjusting position, the step 21b of the change-over ring 21 will restrict the pin 24a of the iron piece lever 24 and then the iron piece lever 24 may not be rotated in a counter-clockwise direction. When the change-over ring 21 is rotated in a counter-clockwise direction, the pin 21d of the change-over ring 21 is set in an operative range of the arm 27c of the automatic focal point adjusting ring and is operated to restrict a movement of the automatic focal point adjusting ring 27 in response to the photographing distance. The engagement between the pin 21e of the change-over ring 21 and the projection 29a of the flash-light device 29 is released, the projection 21g of the change-over ring 21 pushes the projection 218a of the operating lever 218 and causes the operating lever 218 to be rotated in a counter-clockwise direction and thus along with this operation, the end part 220a of the restricting lever 220 engaged with the pin 218b of the operating lever 218 is operated and the restricting lever 220 is rotated in a counter-clockwise direction. This rotation will cause the pin 29c of the flash-light device 29 to be disengaged from the claw 220b of the restricting lever 220, then the flash-light device 29 is moved upwardly. During this movement, the pin 29b of the flash-light device 29 will close a power switch 211 of the flash-light device to prepare for a flash operation for the flash-light device. The pin 29c of the flash-light device 29 is engaged with the cam 212a of the change-over lever 212 to cause the change-over lever 212 to be rotated in a clockwise direction. Thus, the cam 212b of the change-over lever 212 is disengaged from the pin 214a of the apertuure cam lever 214. Then, the cam 214b of the aperture cam lever 214 is set in a track of a shutter opening and closing operative point (not shown).

ASA lever 216 is restricted at such position as the pin 216a of ASA lever 216 is set in response to a sensitivity of film to be used.

Above described operation will complete preparation for the photographing operation.

After a distance to the object is set by operating the the change-over ring 21 and a release button of a camera is pushed down, a shutter setting member (not shown) is disengaged and the set pin 222 is moved in a rightward direction and along with this movement the automatic focal point adjusting ring 27 is rotated in a clockwise direction by the spring 28, is terminated in its movement by an abuttment against the pin 21d of the change-over ring 21 which has been restricted in its movement by the setting of the distance, and then an adjustment for focusing is completed. At the same time, both film speed information determined by the pin 216a of ASA lever 216 and range information determined by a range cam 217 rotatably and pivotally supported on the automatic focal point adjusting ring 27 are imparted to the cam 214b of the aperture cam lever 214 via pin 214c of the aperture cam lever 214. Thereafter, the set pin 222 is farther moved in a rightward direction to open the shutter and to cause a shutter opening and closing operation pin (not shown) to abut against the cam 214b of aperture cam lever 214. Various information is related to the shutter opening and closing operation to terminate the exposing operation. At this time, the flash-light device is iluminated by a well-known operation of the shutter.

When the flash-light device is not required at the manual focal point adjusting position, the pin 29c of the flash-ligh device 29 will cause the claw 220b of the restricting lever 220 to be rotated in a counter-clockwise direction against the spring 221 and ride thereover after the pin 29b of the flash-light device 29 turns off the power switch 211 of the flash-light device in response to manual downward pushing of the flash-light device 29, and thereafter the claw 220b is restricted at a second position 239c. Since the pin 29c of the flash-light device 29 is disengaged from the cam 212a of the change-over lever 212 during this operation, the aperture cam lever 214 is rotated in a counter-clockwise direction via pin 214a of the aperture cam lever 214 by a counter-clockwise rotation of the cam 212b of the change-over lever 212. The cam 214b of the aperture cam lever 214 is moved out of the orbit of the shutter opening and closing pin (not shown) and then an automatic control device is operated under natural light.

Next is described the mode of operation when the change-over ring 21 is changed from the manual focal point adjusting position to the automatic focal point adjusting position. When the change-over ring 21 is rotated in a clockwise direction, the pin 21d of the change-over ring 21 is moved out of the operational range of the arm 27c of the automatic focal point adjusting ring 27, and the step 21b of the change-over ring 21 releases the restriction of the pin 24a of the iron piece lever 24 to enable the iron piece lever to be operated. The pin 21e of the change-over ring 21 forcedly pushes down the projection 29a of the flash-light device 29 to restrict the pin 29c of the flash-light device 29 at a first position 229c. During this operation, since the lock claw 22 is rotated in a counter-clockwise direction by the spring 23 and engaged with a groove 21f of the change-over ring 21, the change-over ring 21 is restricted at its automatic focal point adjusting position.

When the flash-light device 29 descends, the pin 29b of the flash-light device 29 turns off the power switch 211 of the flash-light device and the pin 29c of the flash-light device 29 disengages from the cam 212a of the change-over lever 212. The change-over lever 212 which has been disengaged is rotated in a counter-clockwise direction, the cam 212b of the change-over lever 212 is engaged with the pin 214a of the aperture cam lever 214 to rotate the aperture cam lever 214 in a counter-clockwise direction against the spring 215 and further to move the cam 214b of the aperture cam lever 214 out of the orbit of the shutter opening and closing pin (not shown) and thereby the automatic exposure control device under a natural light is operated to complete preparation for photographing.

When a release button of the camera is depressed, a focal point sensing device (not shown) is operated and at the same time the electro-magnet 26 will hold the attached part 24d of the iron piece lever 24. Upon completion of the sensing of the focal point, the setting pin 222 fixed to a setting member on a shutter base plate (not shown) is moved in a rightward direction, and along with this movement the automatic focal point adjusting ring 27 is rotated in a clockwise direction by the spring 28.

During this operation, the electro-magnet 26 which has received a signal indicating a coincident focal point from the circuit of the focal point sensing device releases the iron piece lever 24, the iron piece lever 24 is rotated in a counter-clockwise direction by the spring 25, the claw 24c of the iron piece lever 24 abuts against the engagement teeth 27a of the automatic focal point adjusting ring 27 and the automatic focal point adjusting ring 27 is automatically stopped when the focal point is set. Then, the setting pin 222 is further moved in a rightward direction to cause a shutter to be opened and closed. A setting operation of the shutter and the automatic focal point adjusting ring 27 is performed such that the shutter is set by a leftward movement of the setting pin 222 fixed to a shutter setting member (not shown) and at the same time the arm 27c of the automatic focal point adjusting ring 27 is rotated in a counter-clockwise direction to engage the shutter setting member with the engaging claw (not shown). During this operation, the cam 27b of the automatic focal point adjusting ring 27 pushes up the cam 24b of the iron piece lever 24 to rotate the iron piece lever 24 in a clockwise direction and then the attracted part 24d of the iron piece lever 24 is attracted against the electromagnet 26.

Then, the flash-light device 29 is restricted at the first position 229c under its automatic focal point adjustment. Under the manual focal point adjustment, the flash-light device 29 is either lifted up or kept at a position projecting slightly from the camera body at the second position 239c and so it is apparent which photographing condition is applied. In order to facilitate further identification of the photographing condition, the display plate 223 indicating the automatic focal point adjusting position (e.g. AF) and the manual focal point adjusting position (e.g. from ∞ to 0.8) is installed in a view finder and a pointer needle 21a of the change-over ring 21 indicates its corresponding position by the change-over operation of the change-over ring 21.

As shown in FIG. 4, the flash-light device 29 may be fixed and, in case the flash-light device 29 is not needed under its manual focal point adjusting position, pushing-down of the pin 225a of the switch 225 which may operate outside the camera will cause the contact piece 225b of the switch lever 225 to slide on the switch base plate 224 and further enable the power switch of the flash-light device to switch from its on to its off state.

In the embodiment shown, it has been indicated that it would be possible to provide the adjustment for a plurality of positions. As is well known in the art, since it is known that a lens of which focal point is set to almost all ranges when a specific distance or range is set, also in the present invention, a change-over operation between the automatic focal point adjusting position and the manual focal point adjusting position may be performed such that two specific positions are selected for its operation.

Figure 5:
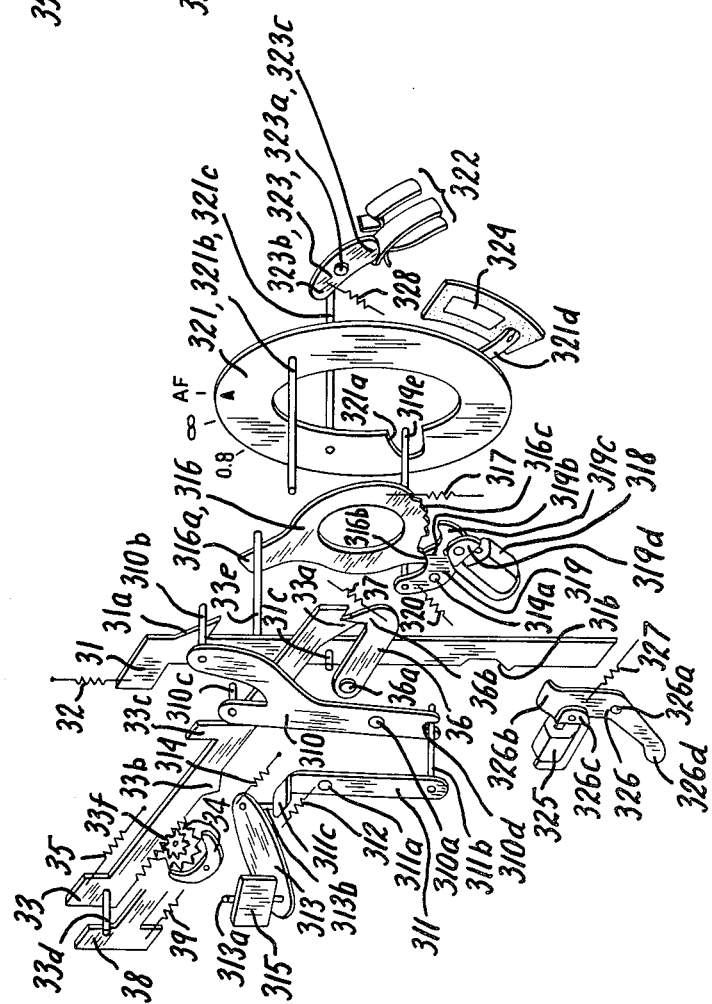
FIG. 5 illustrates the perspective view of the device in a charged state.

Referring to FIG. 5 illustrating a perspective view of the device in a charged state, a release plate 31 having a cam 31a, a projection 31b and a pin 31c is urged upwards by a spring 32 and rests at an upper position.

A first actuating member 33 having projections 33a, 33b and 33c, pins 33d and 33e and a rack 33f engaged with a governor 34 is urged rightwards by a spring 35. A retaining pawl 36 is reciprocable about a pivot 36a and is urged by a spring 37 counterclockwise while retaining said actuating member by the engagement of a hook portion 36b with the projection 33a.

A second actuating member 38 is urged rightward by a spring 39.

A scan lever 310, having a pin 310b related with the cam 31a of the release plate 31, a pin 310c related with the projection 33c of the first actuating member 33 and a forked portion 310d, is reciprocable about a pivot 310a.

An interlocking lever 311, having a pin 311b inserted in the slot on the forked portion 310d of the scan lever 310 and a raised end 311c, is reciprocable about a pivot 311a and is urged counterclockwise by a spring 312.

A mirror lever 313, having a pin 313b related with the raised end 311c, is reciprocable about a pivot 313a and urged clockwise by a spring 314 a little weaker than the spring 312. The mirror lever 313 is provided with a movable mirror 315 having an axis of rotation coaxial with the pivot 313d and rotating together with the mirror lever 313.

An automatic focusing member 316 for positioning the photographing lens, having an arm 316a related with the pin 33c of the first actuating member 33, a projection 316b and ratchet teeth 316c, is rotatable about the optical axis of the photographing lens and is urged clockwise by a spring 317.

An electromagnet 318 is connected to the automatic focus detecting module.

An armature lever 319, having a projection 319b depressed by the projection 316b of the automatic focusing member 316, a pawl 319c engaging with the ratchet teeth 316c of the automatic focusing member 316 and an armature plate 319d disposed opposite the electromagnet 318, is reciprocable about a pivot 319a and is urged counterclockwise by a spring 320.

A pin 319e is fixed on the armature lever 319.

A change-over ring 321 is shaped with an internal cam portion 321a positioned so as not to interfere with the pin 319e of the armature lever 319 and provided with a fixed pin 321b for stopping the arm 316a of the automatic focusing member 316 and a pin 321c.

A sliding contact piece 321d is fixed to the change-over ring 321 and is adjusted to the automatic focusing position. (indicated by "AF" in the drawing)

A circuit changing switch 322 changes the system between daylight photographing and flash light photographing operating modes.

An operating lever 323 for operating the circuit changing switch 322, having an arm 323b related with the pin 321c of the change-over ring 321 and an arm 323c for operating the circuit changing switch 322, is reciprocable about a pivot 323a and is urged counterclockwise by a spring 328. A range information setting resistance 324 is connected to the exposure control module.

An electromagnet 325 is connected to a photographing module and the exposure control module for discriminating conditions to determine if photographing is possible, not shown. A locking lever 326, having a pawl 326b corresponding to the projection 31b of the release plate 31, is reciprocable about a pivot 326a and is urged clockwise by a spring 327. The locking lever 326 has also an armature plate 326c opposite the electromagnet 325 and an exposure finishing part 326d.

Figure 6:
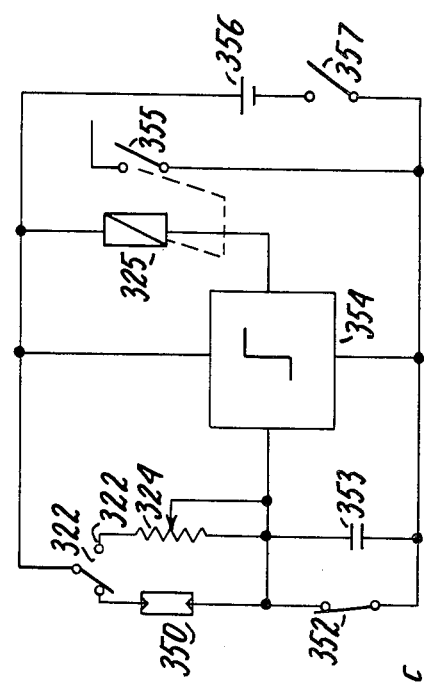
FIG. 6 shows an electronic shutter control module according to the invention.

FIG. 6 is a preferred embodiment of the shutter exposure control module in the form of an electronic shutter control module. The circuit changing switch 322 selectively connects a photoelectric transducer 350 for daylight photographing or the range information setting resistance 324 between the power source and a time integration capacitor 353. A timing switch 352 is opened synchronously with the start of the shutter. A switching circuit 354 is switched when the integrated voltage of the condenser 353 reaches a fixed level. The electromagnet 325 is connected to the switching circuit 354 and controls the exposure finishing timing. A synchronous switch 355 coacts with the electromagnet 325 to form exposure control means and the switch is closed to actuate the electric flash system at the same time when the electromagnet 325 is unmagnetized, therefore, the flash is synchronized with the exposure at any aperture. Numerals 356 and 357 are a battery and a main switch, respectively. Although the synchronous switch 355 is adapted to be closed interlocking with the operation of the electromagnet 325, in a modification, the switching may be done by means of a silicon control rectifying element or the like employing the inversion signal of the switching circuit 354 instead of the synchronous switch 355.

Figure 7:
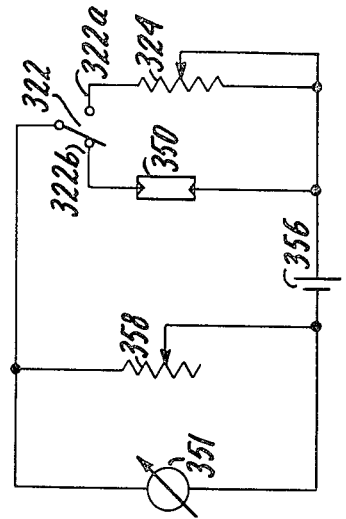
FIG. 7 shows a shutter aperture control module comprising a meter.

FIG. 7 shows the electronic shutter control module applied to a shutter aperture determining system of the type employing a known EE type detecting means and an aperture indicator 351. A film sensitivity setting resistance is indicated by a numeral 358. Other numerals indicate the same parts, respectively, as in FIGS. 5 and 6.

Figure 9:
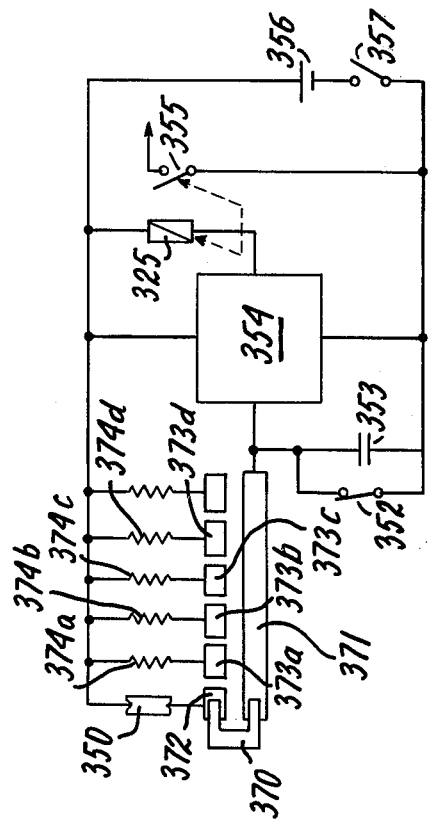
FIG. 9 shows an electronic shutter control module employing the changeover switch of FIG. 8.
Figure 8:
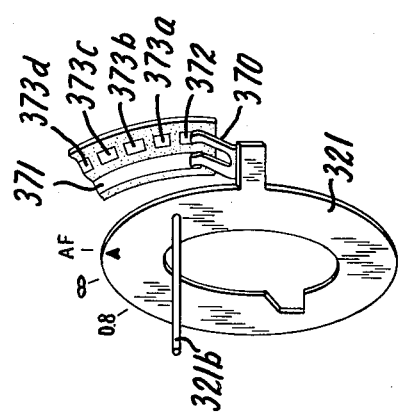
FIG. 8 shows a changeover switch combined with a range information setting device.

FIGS. 8 and 9 show an embodiment in a simplified structure, wherein the change-over switch 322 is used both as a change-over switch for changing between daylight photographing and flash light photographing and a range information resistance selection switch. Referring to FIGS. 8 and 9, there are shown a contact piece and and a common terminal designated as reference numerals 370 and 371, respectively. A terminal 372 is connected to the photoelectric transducer 350 for daylight photographing. Resistances 374a, 374b, 374c and 374d are connected to terminals 373a, 373b, 373c and 373d, respectively. Those resistances are selectively employed corresponding to the focusing position of the change-over ring 321. Like reference characters designate like or corresponding parts throughout, and explanation of these parts will be omitted.

In the operation of the above described device, when the release plate 31 is depressed starting from the position as illustrated, a power switch, not shown, is closed and electricity is fed to an automatic focusing detecting module, not shown, at the initial stage of the depression of the release plate 31. Consequently, the pin 310b of the scan lever 310 moves following the cam 31d of the release plate 31 so that the scan lever 310 starts rotating counterclockwise urged by the spring 312 through the engagement of the forked portion 310d with the pin 311b of the interlocking lever 311 which rotates counterclockwise about the pivot 311d. At the same time, the interlocking lever 311 makes the mirror lever 313 turn counterclockwise about the pivot 313a against the spring force of the spring 314 by the engagement of the raised end 311c with the pin 313b of the mirror lever 313. Accordingly, the movable mirror 315 fixed on the mirror lever 313 starts turning counterclockwise with the mirror lever 313. As the release plate 31 is depressed further, the scan lever 310 turns counterclockwise as far as it hits against the projection 33c of the first actuating member 33, then stops so that the mirror lever 313 stops its counterclockwise rotation as it is interlocked with the scan lever 310 through the interlocking lever 311.

During the series of operations, a fixed mirror, not shown, and the movable mirror 315 together scan the distance between the camera and the object being photographed and the information of the scanning is memorized by the focusing detecting module. With further depression of the release plate 31, the pin 31c of the release plate 31 pushes the retaining pawl 36 to turn the retaining pawl 36 clockwise against the spring force provided by the spring 37 and to release the retention of the hook portion 36b at the projection 33a of the first actuating member 33 so that the first actuating member 33 starts moving rightwards at a low speed. During the rightward movement of the first actuating lever 33, the projection 33c of the first actuating lever 33 pushes the pin 310c of the scan lever 310 which has been in contact with the projection 33c to turn the scan lever 310 clockwise. The rotation of the scan lever 310 is transmitted to the interlocking lever 311 coupled with the scan lever 310 by the pin and fork combination so that the interlocking lever 311 is turned clockwise against the spring force provided by the spring 312. Consequently, the pin 313b of the mirror lever 313 which is in contact with the raised end 311c of the interlocking lever 311 follow the movement of the interlocking lever 311, the mirror lever 313 and the movable mirror 315 fixed on the mirror lever 313 turn clockwise pulled by the spring 314. As the rightward movement of the pin 33e of the first actuating member continues the automatic focusing member 316 is allowed to turn clockwise pulled by the spring 317 and the projection 316b of the automatic focusing member 316 is detached from the projection 319b of the armature lever 319, however, the armature lever 319 remains as it is because the armature plate 319d is attracted by the electromagnet 318. Therefore, the automatic focusing member 316 is able to turn following the first actuating member 33. In the course of return motion of the movable mirror 315, when the movable mirror 315 comes to the position corresponding to the value previously memorized by the focusing detecting module during the initial stage of the movement of the release plate 31, a signal is given to unmagnetize the electromagnet 318, and consequently the armature lever 319 is allowed to turn counterclockwise pulled by the spring 320 and the pawl 319c engages with a ratchet tooth 316c of the automatic focusing member 316 so that the automatic focusing member 316 is retained at the position where the photographing lens is in focus. The members 310–316, as described, constitute an automatic focusing device for detecting the distance between the object to be photographed and the camera and for automatically focusing the photographing lens in accordance with the extent of angular displacement of the automatic focusing member 316. The first actuating member 33 continues moving and the projection 33b of the first actuating member 33 acts on a retaining lever, not shown, to release the second actuating member 38. The second actuating member 38 releases the shutter operating system which actuates the electromagnet 325 through a known exposure operation control module and thus the exposure is performed. When the depression of the release member 31 is terminated at the completion of the exposure, the release member 31 is pulled back to the original upper position by the spring 32.

Explanation has been made of the sequential operation of the device under the normal photographing condition. The following explanation is related to the performance of a safety device which serves when photographing is impossible due to an improper condition of the object to be photographed. The focusing detecting module memorizes the information obtained by the scanning of the movable mirror at the initial stage of the operation of the release plate 31 as explained above and when the value of this information does not reach a prescribed level, the photographing possibility determining module applies a signal to unmagnetize the electromagnet 325 so that the armature plate 326c of the locking lever 326 is released from the attraction and the locking lever 326 is allowed to turn clockwise pulled by the spring 327. Consequently, the pawl 326b of the locking lever 326 enters into the passage of the projection 31b of the release plate 31. As the release plate 31 is depressed further, the projection 31b of the release plate 31 hits against the pawl 326b of the locking lever 326 before the pin 31c of the release plate 31 acts on the retaining pawl 36 retaining the first actuating member 33 so that the downward movement of the release plate 31 is interrupted and therefore, the successive automatic focus detection and shutter operation will not be performed. The photographing possibility determining module may be adapted to function not only when the focusing detection is impossible but also when the brightness of the photographing object is insufficient or when the voltage of the power source has dropped below the prescribed level.

Explanation will be made hereinafter of the charging procedure of the device. When the first actuating member 33 is moved leftwards against the spring force provided by the spring 35, the projection 33a of the first actuating member 33 moves over the retaining pawl 36 which is urged counterclockwise by the spring 37 and finally the first actuating member 33 is retained at the charged position by the engagement of the projection 33a with the hook portion 36b of the retaining pawl 36. The scan lever 310, interlocked with the interlocking lever 311, starts turning counterclockwise when the depression of the projection 33c of the first actuating member 33 on the pin 310c is terminated and stops when the pin 310b came to rest on the cam 31a of the release plate 31. Consequently, the mirror lever 313 turns counterclockwise as it is interlocked with the interlocking lever 311 so that the mirror returns to its original position.

The following explanation is concerned with the performance of the device in the flash light photographing mode of operation.

When the change-over ring 321 is turned counterclockwise to adjust to the position corresponding to the photographing distance, the internal cam portion 321a of the change-over ring 321 comes in contact with the pin 319c of the armature lever 319 while the pin 321c of the change-over ring 321 cancels the constraint of the operating lever 323 to allow the operating lever 323 to turn counterclockwise pulled by the spring 328 so that the arm 323c of the operating lever 323 changes over the switch 322 to the flash light photographing side. The pin 321b of the change-over ring 321 is adjusted to the position where the pin 321b stops the automatic focusing member 316 at the position corresponding to the adjusted position of the change-over ring 321 as described above corresponding to the photographing distance. The sliding contact piece 321d of the change-over ring 321 selectively moves on the range information setting resistance 324. And then, when the release plate is depressed, the focusing detecting system performs its operation as explained in the case of photographing in the normal photographing condition. However, the automatic focusing member 316 turns so far that the arm 316a hits against the pin 321b of the change-over ring 321 because the pawl 319c of the armature lever 319 does not engage with the ratchet teeth 316c of the automatic focusing member 316 as the counterclockwise rotation of the armature lever 319 is obstructed by the engagement of the internal cam portion 321a with the pin 319e of the armature lever 319. After the automatic focusing member is stopped by the pin 321b of the change-over ring 321, the second actuating member 38 actuates the shutter operation as explained in the case of photographing in the normal photographing condition. Referring now to FIG. 6, the change-over switch 322 is switched to the flash photographing side in accordance with the adjustment of the change-over ring 321 and connected to the contact point 322a as shown in the circuit diagram. The timing switch 352 is opened and the resistance 324 selectively determined corresponding to the photographing range and the capacitor 353 starts the time integration. And when the voltage reaches a fixed level, the output of the switching module 354 is inversed to unmagnetize the electromagnet 325 and at the same time the synchronizing switch 355 is closed to actuate the flash. The flash photographing is finished by the unmagnetizing of the electromagnet 325.

FIG. 7 shows an embodiment wherein the device according to the present invention is applied to the shutter of the type which controls the shutter aperture by means of a meter. The film sensitivity setting resistance 358 is connected in parallel to the meter 351. The change-over switch 322 selectively switched between daylight photographing and flash light photographing is provided as illustrated. A photoelectric transducer 350 used for daylight photographing and the range information setting resistance 324 are connected to the contact points 322b and 322a, respectively. When the change-over ring 321 is changed to the flash light photographing side, the switch 322 is switched to the contact point 322a automatically and the value of the range information setting resistance 324 is determined according to the adjusting operation of the change-over ring 321 to the desired distance from the camera to the object to be photographed so that the electric current flowing through the meter 351 is controlled. The meter indicates the shutter aperture desired. The shutter aperture is adjusted according to the indication of the meter 351. Thus the setting of the exposure being adjusted, flash light photographing with the range information taken into consideration is performed satisfactorily by the actuation of the flash device.

FIG. 8 illustrates a further development of the embodiment of the present invention wherein the change-over switch and the range information setting system are combined into one system to simplify the composition of the device. FIG. 9 illustrates the shutter control module provided with the system as shown in FIG. 8. Although a switching module is used in this case, it will readily be understood that the system can be applied to the shutter aperture control system provided with a meter as explained referring to FIG. 7. Referring to FIGS. 8 and 9, the contact piece 370, connected to the change-over ring 321, is disposed so as to short the common terminal 371 and the terminal 372 connected to the photoelectric transducer 350 in the daylight photographing setting and consists together with the capacitor 352 of the integration circuit which controls the exposure operation of the shutter. In case of flash light photographing, the shutter aperture is determined according to the integrated time provided by the integration circuit consisting of the capacitor 353 and one of the resistances 374a, 374b, 374c and 374d which is selectively connected to the common terminal 371 corresponding to the desired flash light photographing range by means of adjustment of the change-over ring 321. This structure eliminates the operating lever 323 and the change-over switch 322 as shown in FIG. 5 so that the device structure is greatly simplified. Furthermore, although the range information setting resistances 374a, 374b, 374c and 374d are shown in the form of an independent resistance in FIG. 9, application of a potentiometer related to the range information will contribute to reduce the dimension of the device.

As apparent from the above description, in accordance with the present invention, a change-over operation of the change-over means in which its automatic operative position is changed to manual position enables a change-over operation of automatic focusing to manual focusing, and enables photographing by the manual focal point adjustment that meets with the intention of the photographing user irrespective of any condition in the object to be photographed.

Since its change-over operation may be made by moving a single change-over means from its manual operating position to its automatic operating position, it is possible to provide such camera as its structure is simple, its operation is easy and less troubles in operation are found.

When charged to the manual focal point adjustment, the camera of the present invention is changed in its operation so that its flash-light photographing device may be operated. Under this condition, when the object is dark and the automatic focal point detector device is not operated, flash-light photographing may be performed.

In the second embodiment, when an exposure for the object is not adequate due to backlight etc., it is possible to provide easy and proper photographing under a combination of automatic focal point adjustment and flash-light automatic exposure control.

As described above, in the present invention, it is possible to provide such camera as its various operations may easily be changed and its operative characteristic is splended.

As is apparent from the foregoing description, in accordance with the third embodiment of the present invention, it is possible to perform a manual focal point adjustment by changing the change-over manual focal point adjustment by changing the change-over means from its automatic focal point adjusting position to its manual focal point adjusting position and at the same time the flash-light device is set to such condition as flash operation may be performed, and then changed to an exposure control system suitable for flash-light photographing. To the contrary, when it is not required to provide a flash-light photographing, only a manual focal point adjustment may be performed by operating the flash-light change-over device.

Therefore, if the object is dark in its color, it is possible to perform photographing under a manual focal point adjustment even if it is impossible to provide an automatic focal point adjustment for the image intended by the photographer. Further, it is possible to provide various conditions of the automatic operating camera by combining the exposure control system under a natural light with the flash-light exposure control system and then there may be provided an easy-to-handle camera.

As explained above, according to the fifth embodiment of the present invention, the shutter exposure control system is changed from the daylight automatic exposure control setting to the flash light automatic exposure control setting in synchronism with the changing operation of the changeover means, which manually selects the automatic focusing or the manual focusing, from the automatic focusing to the manual focusing.

Accordingly, when the automatic focusing is impossible due to an unsatisfactory photographing condition such as insufficient brightness of the object to be photographed, and the system is changed over to the manual focusing setting, the flash light automatic photographing system is set simultaneously. Thus the present invention provides a shutter which is easy to operate, simple in construction, low in the manufacturing costs and is less probable to fail.

We claim:

1. A lens focal point adjusting and mode change-over device for a camera having automatic lens focal point adjustment, comprising: change-over means manually operable for changing a camera operating mode between automatic focusing and manual focusing, said change-over means including a manually positionable member manually positionable at a position for operating a camera in an automatic focusing mode and manually positionable over a range of positions for operating a camera in a manual focusing mode and at a camera lens focal point setting determined by the position of said manually positionable member; and means for restricting a position of a positionable camera lens in response to a signal representative of a distance between an object and the camera lens, said restricting means cooperating with said change-over means for operating to allow automatic focusing of the camera lens when said change-over means is set for automatic focusing, and said restricting means being rendered inoperative by said change over means when said change-over means is set for manual focusing, thereby to allow focusing by positioning of said manually positionable member of said change-over means.

2. A change-over device as set forth in claim 1 characterized in that said restricting means includes an electro-magnet to be controlled by said signal and renders said electro-magnet to be inoperative in cooperation with a change-over operation of said change-over means into said position for manual operation.

3. A change-over device as set forth in claim 1 in which said position for automatic operation of said change-over means includes at least two positions, an automatic exposure control device operated under a natural light at the first position for automatic focusing operation and an automatic exposure control device operated under an artificial light at the second position for automatic focusing operation.

4. A focal point adjusting and change-over device for a photographing lens as set forth in claim 1 characterized in that a flash-light photographing device is operatively changed in cooperation with a change-over operation of said manually operable change-over means into said position for manual operation.

5. A change-over device as set forth in claim 4 characterized in that said flash-tight photographing device includes an illuminating unit and said illuminating unit is enabled to illuminate in response to said change-over operation to the manual focusing position of said change-over means.

6. A change-over device as set forth in claim 4 characterized in that said photographing device includes at least one of an aperture device and an exposure time control device, at least one of the devices is adjusted to a value appropriate to an artificial light in cooperation with said change-over operation to the manual focusing position of said change-over operation to the manual focusing position of said change-over means.

7. A change-over device in an automatic focal point adjusting camera in which a distance between the object and the camera is sensed to enable an automatic focusing in a photographing lens characterized in that there are provided a change-over means operable to at least two positions including an automatic and a manual focal point adjusting positions, a flash-light change-over device movable from its non-operative position to its operative position in response to a change-over of said change-over means into said manual focal point adjusting position and a limiting means for restricting said flash-light change-over device at its non-operative position, said change-over means having an area for releasing said limiting means in cooperation with a change-over operation from the automatic adjusting position to the manual adjusting position, said flash-light change-over device is restricted to the non-operative position by said limiting means at said manual adjustment position when said flash-light change-over device is moved to its non-operative position and moves said flash-light change-over device to its non-operative position in cooperation with the change-over of said change-over means into said automatic focal point adjusting position.

8. In an automatic focusing flash camera of the type in which a distance between an object and the camera is sensed to automatically focus the camera, a change-over device comprising: mode change-over means operable for changing the camera operating mode between an automatic focusing mode and a manual focusing mode; flash change-over means movable from an inoperative position to an operative position in response to changing said mode change-over means to the manual mode; and limiting means for holding said flash change-over means in the inoperative position; said mode change-over means being effective for releasing said limiting means in response to changing from the automatic mode to the manual mode and for changing said flash change-over means to the inoperative position in response to changing from the manual mode to the automatic mode; and said limiting means being effective to hold said flash change-over means in the inoperative position if the same is changed to the inoperative position when said mode change-over means is set in the manual mode.

9. A change-over device as set forth in claim 7 or 8 characterized in that an automatic exposure control device under a natural light is operated at the non-operative position of said flash-light change-over device and said exposure control device under an artificial light is operated at the operative position of said flash-light change-over device.

10. A change-over device as set forth in claim 7 or 8 characterized in that there is provided a display means for displaying at least said two modes of said change-over means and for displaying a corresponding position in cooperation with the change-over of said change-over means.

11. A change-over device as set forth in claim 7 or 8 characterized in that said flash-light change-over device may be moved in sequence to a first position in which it is moved along with said change-over means, a second position in which it is restricted by said limiting means from moving to said operative position.

12. A flash exposure setting changing device for the automatic focusing camera comprising, an automatic focusing device which detects the distance between the photographing object and the camera and automatically focuses the photographing lens; a changing means which manually detects the automatic range and the manual range of said focusing device; an exposure control means which controls the shutter aperture corresponding to the output level of an electronic module; and a setting means which changes said electronic module between the natural light automatic exposure control and the flash light automatic exposure control, wherein said changing means has a first changing unit which makes said focusing device manually operable only in the manual range, and a second changing unit which changes said setting means to natural light automatic exposure control in the automatic range of said focusing device and changes said setting means to flash light automatic exposure control in the manual range of said focusing device.

13. A changing device, as set forth in claim 12, wherein said changing means has a range factor selective unit which changes said setting means to said flash light exposure control in the manual range and sets the range value of said electronic module corresponding to the selected range.

14. A changing device, as set forth in claim 13, wherein said range factor selective unit is provided with a plurality of electric elements of different value and is adapted to connect said electric elements to said electronic module depending on the selected range in the manual range of said changing means.

* * * * *